United States Patent
Lockner et al.

[11] Patent Number: 5,157,858
[45] Date of Patent: Oct. 27, 1992

[54] CRAB LINE ROLLER

[76] Inventors: William C. Lockner, 1249 W. College Ave., York, Pa. 17404; Michael S. Bisking, 3050 Brookside Ave., Dover, Pa. 17315

[21] Appl. No.: 796,849

[22] Filed: Nov. 25, 1991

[51] Int. Cl.⁵ .............................................. A01K 79/00
[52] U.S. Cl. ...................... 43/27.4; 248/534
[58] Field of Search .................. 43/27.4; 248/514, 534

[56] References Cited

U.S. PATENT DOCUMENTS

| | | | |
|---|---|---|---|
| 1,520,543 | 12/1924 | Meachen | 248/534 |
| 2,888,770 | 6/1959 | Patrick | 43/27.4 |
| 2,893,667 | 7/1959 | Shumaker | 248/514 |
| 2,920,855 | 1/1960 | Gilbel | 248/534 |
| 3,385,544 | 5/1968 | Barnett | 248/534 |
| 3,417,502 | 12/1968 | Thomas | 43/27.4 |
| 3,419,990 | 1/1969 | Lewis | 43/27.4 |
| 3,626,630 | 12/1971 | Tison | 43/27.4 |
| 3,896,579 | 7/1975 | Benne | 43/27.4 |
| 4,321,766 | 3/1982 | Henderson | 43/27.4 |
| 4,335,534 | 6/1982 | Allred | 43/27.4 |
| 5,048,222 | 9/1991 | Correll | 43/27.4 |

Primary Examiner—Kurt Rowan
Attorney, Agent, or Firm—Richard C. Litman

[57] ABSTRACT

A device designed to be removably attached to a boat gunwale which both guides and supports a baited trot line for the capture of marine crustaceans (crabs) by a person at a catching station wielding a net. Attachment to the gunwale consists of two mounting arms which can be secured by a variety of means. A telescoping arm permits adjustment of the distance between the boat hull and the trot line. The arm has a horizontally disposed guide and support roller mounted in a bracket which is affixed to the telescoping part of the arm. As the boat moves parallel to the baited trot line, the trot line is carried over the roller. This causes the baited section to rise to the surface of the water allowing the person to capture (apprehend) the crab.

13 Claims, 2 Drawing Sheets

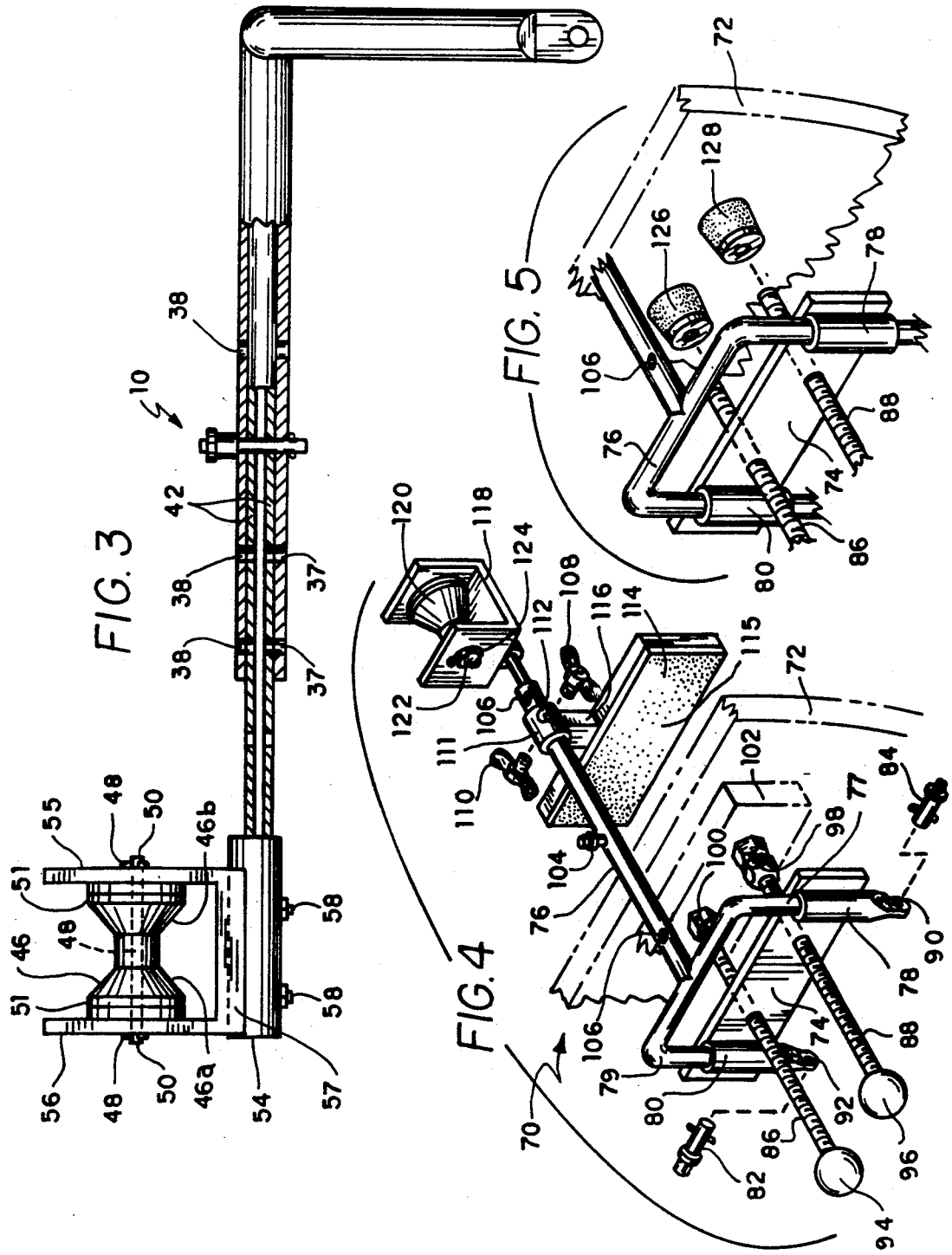

CRAB LINE ROLLER

FIELD OF THE INVENTION

The present invention relates to the catching of crabs (marine crustaceans) and more specifically to a removable attachment for crabbing boats which elevates a baited line allowing for the capturing of feeding crabs.

DESCRIPTION OF THE PRIOR ART

Devices which elevate and support a baited line for the acquistion of seafood or fish products are known. U.S. Pat. No. 1,777,783 issued to Burns et al. discloses an automatic crab catching device. This complicated mechanism entails the baited line being pulled over several pulleys, depositing the crabs in a vertically tapered trough. A conveyor-scoop device then brings the captured crabs aboard to a storage area.

U.S. Pat. No. 3,626,627 issued to Osborne discloses a trot line runner. The device consists of a plurality of wheels that act as a line guide and facilitate the movement of the line past the boat, these guide wheels being mounted to the side of the boat by a mounting structure. The mounting structure is further braced relative to the side of the boat, in such a manner where the boat will run parallel to the line.

U.S. Pat. No. 3,664,637 issued to E. A. Troiano discloses a trot line guide. This guide is designed to be mounted to the side of a boat, to facilitate the removal of catch from the trot line. The guide consists of a horizontal roller, and two vertical rollers to maintain the trot line on the horizontal roller. The distance from the boat to the horizontal roller is fixed and no provision is made for its adjustment.

U.S. Pat. No. 3,896,579 issued to Benne discloses a trot line lifting device. This unit is attached to the side of a fishing vessel and is designed to raise a submerged trot line out of the water to facilitate the removal of fish from the line. The lifting device comprises an elongated tubular guide member defining a sleeve. An arm projecting laterally from the guide member is used to secure the tubular guide member to the side of the boat.

U.S. Pat. No. 4,335,534 issued to Alfred discloses a trot line guide. The guide consists of a circular slot provided on the top part of a board type structure. The trot line is designed to be held in and slide through the circular slot. The board structure has clamps and suction cups which are designed to attach the device to the hull of the boat. At least two of these removable guideboards are designed to be used to suspend the catch from the water.

None of the above referenced devices, considered either singly or in combination, is seen to suggest the instant invention as claimed.

SUMMARY OF THE INVENTION

The invention comprises a device designed to be removably attached to a boat hull which both guides and supports a baited line for the capture of marine crustaceans (crabs) by a person at a catching station wielding a net. The attachment consists of two mounting arms which can be secured to the hull in a variety of means. A telescoping arm is provided which permits adjustment of the distance between the boat hull and the line. The arm has a horizontally disposed guide and support roller mounted in a bracket which is affixed to the telescoping part of the arm. As the boat moves parallel to the baited trot line, the line is carried over the roller. This causes the baited section to rise to the surface of the water allowing the person to capture (apprehend) the crab. Basically, the crab line roller is attached to a boat. The trot line is baited and then placed over the roller. The boat proceeds slowly maneuvering parallel to the trot line. The arm is adjusted to an appropriate distance away from the boat, and as the trot line passes over the roller, the roller rotates. The baited line is then pulled toward the surface of the water. A person mans the catching station and as a crab approaches the surface it is apprehended by a net.

Accordingly, one object of the present invention is to provide a crab line roller which can be installed on an existing boat with minimum modification to the boat.

Another object of the present invention is to provide a crab line roller which is simple to adjust in height and distance from the gunwale of a boat.

Another object of the present invention is to provide a crab line roller which is simple to set up in an operating condition and easy to take down as well as store.

Another object of the invention is to provide a crab line roller which is removable attachable to any boat hull configuration.

These and other objects of the present invention will become readily apparent upon further review of the following sepcification and drawings.

BRIEF DESCRIPTION OF THE DRAWINGS

FIG. 3 is a partial sectional view of the first embodiment of the crab line roller;

FIG. 4 is a perspective view of the second embodiment of the crab line roller showing the mounting bracket; and FIG. 5 is a partial view of the second embodiment showing alternative holding devices.

Similar reference characters denote corresponding features consistently throughout the attached drawings.

DETAILED DESCRIPTION OF THE PREFERRED EMBODIMENTS

Figure 1:
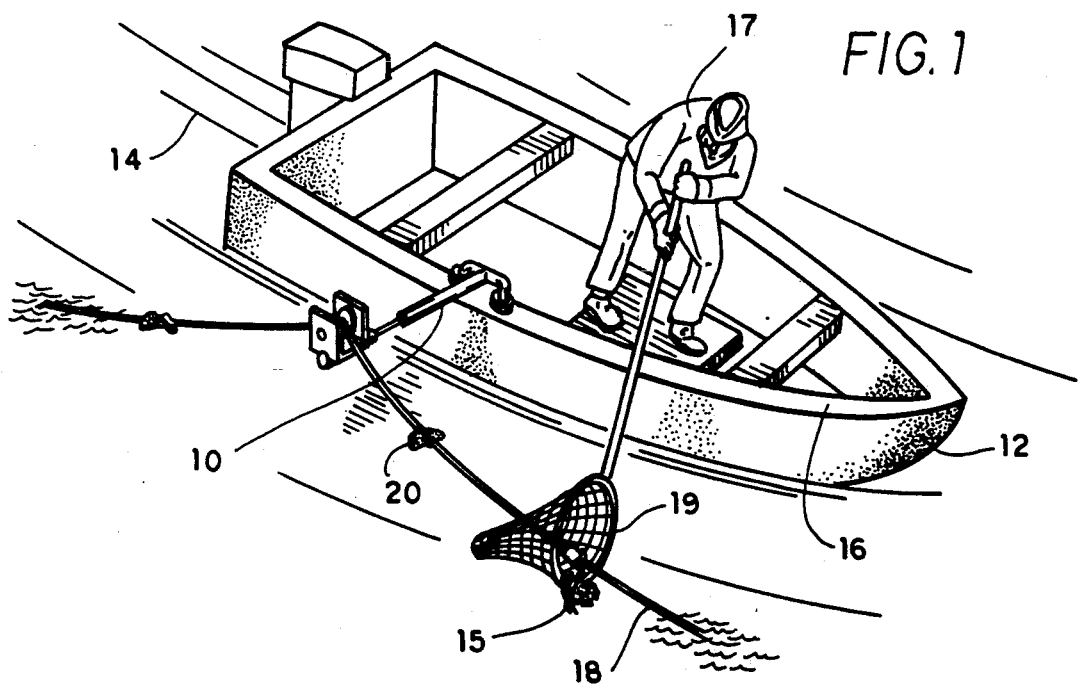
FIG. 1 is an environmental view of the first embodiment of the crab line roller in use on a crab boat.
Figure 2:
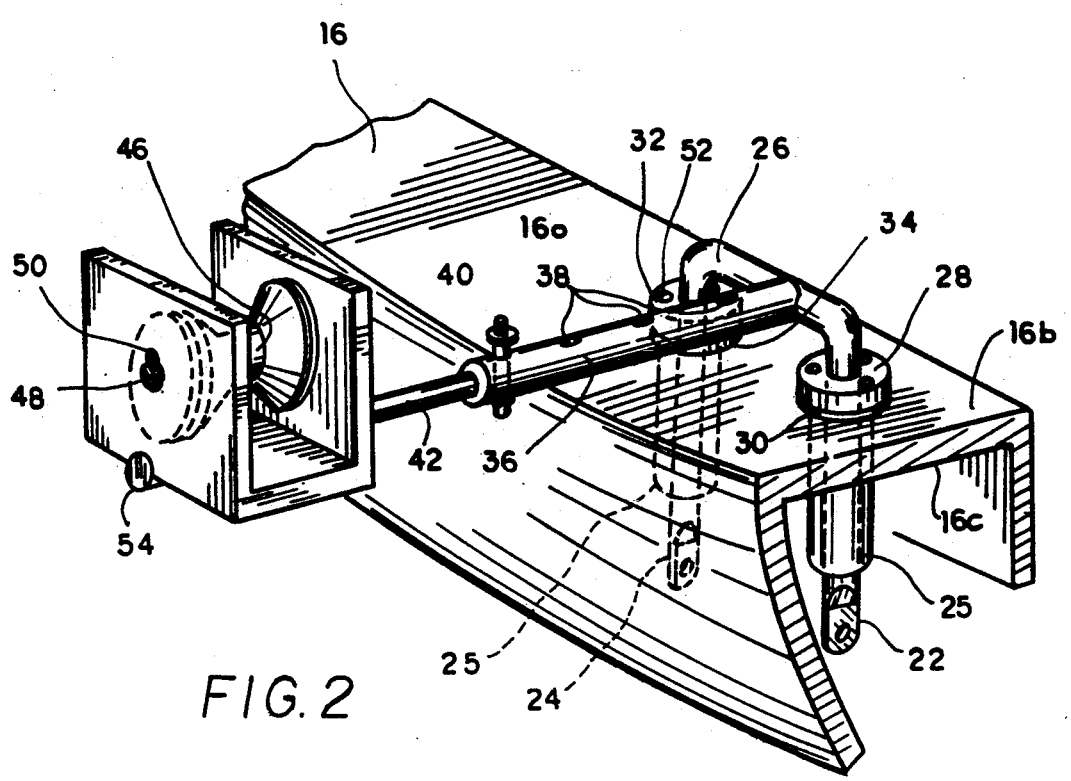
FIG. 2 is a perspective view of the first embodiment of the crab line roller mounted on a gunwale of a crab boat.

The first embodiment of the crab line roller 10 is shown in the first three figures. The crab line roller 10 is to be used to raise and guide a trot line 18 out of the water 14. The trotline 10 has bait 20 attached to it. The bait 20 is usually decaying chicken or eel. The bait 20 lures a crab 15, which begins feeding. The trot line 18 is then raised to the surface of the water 14, where the crab catcher 17 apprehends the crab 15 with crabbing net 19. The crab 15 is then suitably stored on the boat 12. The trot line 18 is in one embodiment 500 feet long, and has bait 20 secured at two foot intervals. The boat 12 proceeds up and down the length of the trot line 18 catching crabs 15 as they feed.

The crab line roller 10 is attached to the gunwale 16 of a boat 12 by two parallel cylindrical legs (22, 24). The gunwale 16 will be seen to extend inwardly, to form a horizontal wall 16a having an upper surface 16b and a lower surface 16c. There is a right leg 22 and a left leg 24. These cylindrical legs 22 and 24 comprise anchoring means for crab line roller 10. These mate with a right 28 and a left mounting disk 32 which are also cylindrical and have a hole provided through their centers. Disks 28 and 32 comprise mating collars for the anchoring means of crab line roller 10. This hole is the same diameter of the cylindrical legs (22, 24) which permit the right 22 and left legs 24 to pass through the right 28 and left disk 32. Between the cylindrical disks (28, 32) and the gunwale 16 a right 30 and left rubber washer 34 is provided. The disks (28, 32) and rubber washers (30, 34) are secured to the gunwale 16 by a plurality of screws 52. The rubber washers (30, 34) prevent the disks (28, 32) from damaging the gunwale 16 when the screws 52 are tightened down. A pair of tubular cylindrical members 25 are secured in the gunwale 16 to further stabilize and support the legs (22, 24).

The right 22 and left leg 24 are connected by a connecting rod 26. The connecting rod 26 is of the same diameter as the right 22 and left leg 24 and the three portions form a U shape in the same plane. A hollow cylindrical tube 36 is secured to the center of the connecting rod 26 in a perpendicular manner. This hollow tube 36 acts a sleeve which houses an arm 42. The arm 42 is cylindrical, and its diameter is slightly smaller than the diameter of the hollow portion of the tube 36. The hollow tube 36 has a plurality of boreholes 38 which pass completely through both sides of the hollow tube 36. These boreholes 38 are equally distant from each other and are identically oriented. The arm 42 has the exact number of arm boreholes 37 provided through its body as the boreholes 38 provided on the sleeve 36. These arm boreholes 37 are the same diameter as the boreholes 38 made in the sleeve 36. A quick release pin 40 is designed to be passed through both sets of boreholes (37, 38), which secures the arm 42 in relation to the sleeve 36. Quick release pin 40 serves as a removable member relative to sleeve 36 and arm 42. This allows the arm 42 to be securably extensible, that is to allow the arm 42 to be extended to discreet distances in a securable manner, with the hollow tube (sleeve) 36 acting as a support. At the outer end of the arm 42 a cylindrical mount 54 is provided. This is secured to the flat base 57 of the mount 44 by screws 58.

At the outer end of the arm 42 a horizontal roller 46 is rotatably secured to a mount 44 on a rod 48 about which the roller 46 rotates. The mount 44 is of a U-shape construction which consists of a flat base 57 connected to a right 55 and a left panel 56. The rod 48 passes through opposing holes centrally disposed in the right 55 and the left panel 56 and is secured by a pair of cotter pins 50, one each on the outside face of the right 55 and left panel 56 respectively. The horizontal roller 46 is cylindrical in its center and has a right 46B and a left guide section 46A which are truncated cones or tapered in configuration. A hole is provided from right to left through the roller 46 which is of slightly larger diameter than the rod 48. The rod 48 is then placed through this hole which passes through the roller 46 which affixes the roller 46 to the mount 44. Two cylindrical spacers 51 are placed to the right and left of the truncated cone or tapered section (46A, 46B) of the roller 46.

The second embodiment of the crab line roller 70 is shown in FIGS. 4 and 5. The horizontal roller or spool 120 supported by a mount 118, telescoping arm 75, associated sleeve assembly 76, right leg 77, left leg 79, bore hole 106, locking pin 104, rod 122 and cotter pin 124 are as described in the first embodiment. The universal attachment clamp allows the crab line roller 70 to be attached to the hull section of any boat. The clamp is secured non-invasively and non-destructively to the boat hull. The universal attachment clamp basically comprises a first or inner plate 74, a second or outer plate 114, and screws 86 and 88 as well as additional components described below, and this universal attachment clamp serves as a gunwale attachment means for crab line roller 70.

The first or inner plate 74 is secured to a right receptacle 78 and to a left receptacle 80. The right 78 and left receptable 80 are designed to receive the right 77 and left legs 79 of the body of the crab line roller 70. The legs (77, 79) are secured in the receptacles (78, 80) by the blocking action of a right 84 and a left removable pin 82 that is placed through a right 90 and a left borehole 92 which are located at the distal ends of the right 77 and left legs 79 of the body of the crab line roller 70. A right and a left hole, respectively comprising first and second screw holes, are placed through the first or inner plate 74 and are tapped in order to receive threaded screws. A first or right threaded screw 88 and a second or left threaded screw 86 are placed through the tap holes. The first and second screws (86, 88) are each provided with a handle (94, 96) for adjustment and for placement about the hull 72. At the distal end of the screws (86, 88) an end member (98, 100) intersects a piece of wood 102 to prevent the hull 72 from being damaged as the screws (86, 88) are tightened. The end member (98, 100) shown in FIG. 4 are bolt members.

A second or outer plate 114 is provided which is connected to a collar 111 by a neck portion 116. The collar 111 is designed to fit over the sleeve 76 for the telescoping arm 75 and the collar 111 is to be secured to the sleeve 76 by the tightening of two wingnut style screws (108, 110) into two appropriately tapped mating holes 112. Thus, collar 111 and screws 108 and 110 provide attachment means enabling second or outer plate 114 to be removably secured to any desired point along sleeve 76 or arm 75. The second or outer plate 114 is covered with a rubberized resilient layer 115 in order to protect the outer hull from damage.

For the purposes of the claims, the assembly of first or inner plate 74 and right and left receptacles 78 and 80 attached thereto, comprise a first plate assembly. A second plate assembly is formed of second or outer plate 114, including neck portion 116 and collar 111. Right and left receptacles 78 and 80 respectively serve as first and second cylindrical members for the receipt of legs 77 and 79.

The mounting of the crab line roller 70 onto the hull 72 proceeds as follows. First, the legs (77, 79) of the crab line roller 70 are placed in their respective mounting receptacles (78, 80) and are secured in place by their respective removable pins (82, 84). The outer plate collar 111 is placed over the sleeve 76 and secured thereto by thumbscrews (108, 110) at an appropriate distance. The right and left screws (86, 88) are then tightened down to the interior of the boat hull 72 and the crab line roller 70 is firmly secured.

FIG. 5 shows an alternate pair of end members (126, 128) which are removably securable to the distal end of screws (86, 88). These are made of a resilient material which would not damage the hull 72. No board needs to be employed to prevent damage to the hull 72.

It is to be understood that the present invention is not limited to the embodiments described above, but encompasses any and all embodiments within the scope of the following claims.

We claim:

1. A trot line device for lifting and supporting a trot line out of a body of water for the purpose of providing access to prey which may have been lured by a bait means disposed on said trot line, said trot line device comprising a spool supported on an arm, said arm attached to a gunwale of a boat, said gunwale having a horizontal wall, said horizontal wall further having an upper surface and a lower surface, said arm adjustably extending from said boat, said device having releasable anchoring means for attachment to said gunwale, said anchoring means penetrating said gunwale from said upper surface and said anchoring means being secured by cylindrical members disposed below said lower surface.

2. A trot line device as claimed in claim 1 further comprising a plurality of mating collars, said mating collars connected to said upper surface of said gunwale, said mating collars being equal in number to said anchoring means, said mating collars receiving said anchoring means, said mating collars connected to said upper surface of said gunwale by fastener means.

3. A trot line device as claimed in claim 2 further comprising a receptacle having a plurality of tubular cylindrical members, said cavities securably mounted to said lower surface of said gunwale, said tubular cylindrical members being equal in number to said anchoring means and receiving said anchoring means, said tubular cylindrical members disposed coaxially with and underneath said mating collars.

4. A trot line device as claimed in claim 1 further comprising a sleeve, said sleeve connected to said anchoring means, said sleeve being hollow and receiving said arm, said sleeve and said arm having alignable boreholes, said boreholes being selectively penetrated by a removable pin, whereby said arm is adjustably extendible from said sleeve.

5. A trot line device as claimed in claim 1 further comprising a first and second set of boreholes, said first and said second set of boreholes equal in number and diameter, said first set of boreholes provided vertically through said arm, said second set of boreholes provided vertically through a sleeve, said sleeve receiving said arm, said first and second set of boreholes receiving another removable member, whereby said arm may be securely fixed at a series of discreet horizontal distances from said gunwale.

6. A trot line device as claimed in claim 1 further comprising a U shaped mount, said U shape mount having a vertical right panel, a parallel vertical left panel and a connecting horizontal bottom panel, opposing holes centrally disposed in said right panel and said left panel, a spool mounting rod extending through and supported by said holes and said spool disposed intermediate said right and left panels, said spool being rotatably disposed on said spool mounting rod, whereby said trot line may pass over said spool causing said spool to rotate.

7. A trotline device which is to be secured to the gunwale of a boat, said gunwale having an inner surface and an outer surface, said device comprising:
 a spool rotatably connected to a mount, said mount connected to a telescoping arm, said arm attached to a first leg and a second leg,
 gunwale attachment means, said attachment means providing for the attachment of said trotline device to said gunwale in a removable and noninvasive manner.

8. A trotline device as claimed in claim 7 wherein said gunwale attachment means comprises a first plate assembly and a second plate assembly.

9. A trotline device as claimed in claim 8 wherein said first plate assembly comprises a first plate connected to a first cylindrical member and a second cylindrical member, said first and second cylindrical members designed to receive said first and second leg respectively.

10. A trotline device as claimed in claim 9 wherein said first plate has a first and second screw hole, said first and second screw hole permits the in and out motion of a first and second screw when said first and second screw are rotated.

11. A trotline device as claimed in claim 10 wherein said second plate assembly consists of a second plate, said second plate connected to a neck, said neck connected to a collar and said collar slideable on said telescoping arm.

12. A trotline device as claimed in claim 11 wherein said second plate assembly comprises attachment means which permits said assembly to be fixed to any location on said arm.

13. A trotline device as claimed in claim 12 wherein said trotline device is secured to said boat by securing said second plate against said outer surface and rotating said first and second screws until said screws are flush against said inside surface.

* * * * *